UNITED STATES PATENT OFFICE.

BENJAMIN S. PASCHALL, OF SEATTLE, WASHINGTON.

SUBSTANCE FOR TREATMENT OF TUBERCULOSIS AND PROCESS OF MAKING SAID SUBSTANCE.

1,078,873.

No Drawing.

Specification of Letters Patent.   Patented Nov. 18, 1913.

Application filed October 12, 1912. Serial No. 725,439.

*To all whom it may concern:*

Be it known that I, BENJAMIN S. PASCHALL, a citizen of the United States, and a resident of Seattle, State of Washington, have invented certain new and useful Improvements in Substances for Treatment of Tuberculosis and Processes of Making Said Substances, of which the following is a specification.

This invention relates to a new method of treating tuberculosis, based upon hitherto unknown biochemical phenomena and by means of a new substance produced by a new process.

All micro-organisms are divided into two main groups, animal and vegetable. The vegetable group of micro-organisms are chiefly acute disease producers in animals and man, with the exception of those micro-organisms which elaborate large amounts of certain protective substances of a fatty or wax like nature (fats, waxes, lecithins and cholesterins) chief among these being the bacilli of tuberculosis and leprosy. It is well known that the destruction of bacteria of the character of typhoid and pneumonia by the animal body, depends chiefly on the production of a specific substance against the disease micro-organism, now recognized as a proteolytic enzym. The time required for the production of these enzyms in sufficient quantity to digest the invading bacteria is approximately from seven to twenty-one days and its maximum production occurs simultaneously with the crisis of the disease. Killed, ground-up typhoid bacilli or pneumococci injected into an experimental animal are practically non-poisonous on the first injection, except in enormous doses, but no more so than similar doses of any other albuminous body like egg or milk albumen. A second injection of any albuminous body, however, from seven to twenty-one days later will produce severe symptoms of intoxication due to the fact that when the enzym gradually formed as a result of the first injection of the bacteria or albumen is present already, there occurs a sudden cleavage of the molecules into peptone-like bodies, some of which are highly poisonous, and the animal frequently dies quite suddenly after this second injection (anaphalaxis).

A tuberculin reaction shows the presence of tuberculosis only because of the presence of specific enzyms in the tuberculous individual or animal, capable of splitting and digesting the proteid portion of the tubercle bacillus. Obviously then, it is the protective impregnation of wax and fat-like bodies throughout the protoplasm of the tubercle bacillus which prevents the proteolytic ferment already present in the host from digesting and destroying the tubercle bacillus. (This was understood by Koch.)

The chemical explanation has been sought for the reason why tuberculosis and leprosy last for years and continue to grow and increase to the detriment of the host, in spite of the apparent presence of abundant proteolytic enzyms, which would be capable of dissolving the proteid portion of the tubercle bacillus, if such enzym could penetrate through the protective wax, the presence of these enzyms being shown by the tuberculin reaction which is constantly present in every case of tuberculosis.

If the animal organism does one thing in one place in a certain way, it is pretty certain to employ the same method in another place. In other words, if the alimentary tract digests proteid with the ferment, the tissue cells in the body at large would be more likely to employ that method of disposing of a foreign proteid than any other, and this has been conclusively proved. The intestines manufacture amyolytic ferments for splitting starches, and also ferments for splitting fats and to some extent waxes known as lipolytic ferments, but I have discovered that the tissues can do the same thing, that is, manufacture lipolytic ferments, differing from the intestinal ferments in the same manner that the proteolytic tissue ferments do, in that they are specific for the particular fat from which the injected fat derivative is made.

Reference may be made to Kalle & Co.'s patents covering a substance known as "tuberculo-nastin" made by extracting the wax and fats of tubercle bacilli with suitable solvents, such as chloroform, ether, alcohol, toluene and benzene, as English Patent No. 26,077, of 1906; German Patents Nos. 193,883 and 199,200; English Patent No. 27,383 of 1907; German Patent No. 201,989, addition to German Patent No. 199,200, calling for the use of solvents such as benzyl, alcohol, benzaldehyde, salicylaldehyde, cinnamicaldehyde, etc. The use, however, of tubercle wax extracted by solvents has not met with absolute success therapeutically, though their results have been decidedly encouraging, the latest reports being by Much and Leschke, who used these substances and reported their results in the *Beitrage zur Klinik Tuberkulose*, Bd. XX, Heft 3, 1911.

Zeuner employed a different method covered by German Patent No. 213,629. He treated the tubercle bacilli with hot soap solution (sodium oleate) for a few days, using heat and his experiments on animal and man were decidedly encouraging using this substance. Noguchi, Rockefeller Institute, corroborated this work. (*Reports of Sixth International Congress for Tuberculosis.*) Guinea-pigs lived from seven to thirteen weeks longer than the control animals. This was a reasonable result, in that the lipolytic ferment of the intestine saponifies only part of the fats, the remaining portion being dissolved in the resulting soap solution and absorption thereby taking place. As the fat droplets dissolved in soap pass through the intestinal wall, certain changes of a biological nature take place, in that animal fat is converted into human fat, as shown by the difference in the iodin number. Zeuner, however, by this method, is unable to get rid of the proteid adherent to the fat and also has no way of getting rid of the volatile fatty acids and toxic residues and other extraneous substances contained in the fat, which would absolutely prevent giving an immunizing dose. A description of Zeuner's method, with his results, may be found in *Zeitschrift fur Tuberkulose*, 1909, Bd. XV, Heft 2.

In the methods covered by Kalle & Co.'s patents, the body has as much trouble splitting up the waxes and thereby calling forth the production of a large quantity of lipolytic ferment as obtains in the original disease by the presence of the original tubercle waxes in their natural state surrounding the bacillus in the diseased body. These waxes are, it is true, foreign bodies, but practically non-irritating and the tissues tolerate them and do not seek to get rid of them to any greater extent than they try to get rid of a piece of paraffin injected at any point under the skin. Paraffin or wax will remain where injected for a very long time, due to their benign and non-irritating character.

Experiments on the iodin value of hog fat and dog fat, for instance, differ sufficiently to separate these fats chemically. Hog fat fed to a dog reappears in the mesenteric fat as dog fat, but hog fat injected into a dog through the blood, reappears in the mesenteric fat as hog fat and gives the iodin number of hog fat. As such, it remains there for long periods of time. Other experiments with animal and vegetable fats show the same phenomena. Such phenomena occur, also, if hog serum is injected into a dog. The serum is attacked, a ferment is manufactured for its digestion, it is digested and converted into something else, leaving behind it a new specific ferment as a result of its presence.

I have discovered that if a lipolytic ferment is to be produced in the tissues in large quantities, active and specific, so that it will attack and digest the tubercle waxes and fats, these waxes and fats must first be split just as done by the intestines by a saponification method. Instead of using a ferment for the saponification, I produce saponification by chemical means, as by means of an alkali. The resulting saponified wax will now so influence the body cells upon injection, as to force them in turn to produce a lipolytic ferment capable of performing the important function of digesting tubercle waxes and fats in their original state. The explanation of these phenomena lies within the realm of colloidal chemistry, since the soap, like the albuminous body is a true colloid, which waxes and fats are not. After the production of this lipolytic ferment and the splitting of the waxes and fats from the tubercle bacillus, the destruction of the remaining portion of the bacillus readily occurs, as has been actually demonstrated by my researches through animal experimentation and upon man.

My method of treating tuberculosis is additionally an improvement on any other, in that the saponification method enables one absolutely to get rid of the last traces of proteid and a number of other substances which are of a highly injurious character when injected.

Pure saponified tubercle wax has been found to give no reaction shock in the sense that proteid substances, as tuberculins do, that is, high temperature, labored breathing, vomiting, etc. Furthermore, certain extraneous substances may be separated by alcohol or ether extraction of the fatty acids, these substances being in part unknown, and in part consisting of oleo-resins, nucleo-proteids, chitin, pectin and other substances of that nature. The injection of tuberculonastin of Kalle's patents produces an ugly swelling, terminating in a hard insoluble lump, as if paraffin or other wax was injected under the skin and most of it remains unabsorbed for months. To obviate this objection, benzyl chlorid and other substances are used, as mentioned above, but these have not proved satisfactory. Pure saponified wax, on the other hand, as I have produced it, is entirely absorbed in a few days unless too concentrated, leaving behind no trace whatsoever, as abscess formation may result from too great concentration. My improved substance produces some slight irritation for a few minutes following injection.

The substance is entirely harmless and maximum doses sufficient to check the disease may be obtained after the third or fourth dose given once a week.

As to the strength of the soap, I prefer to evaporate it as near dryness as possible to a consistency of a thick paste. One gram of this is then added to 10 cc. normal salt solution of which 100 cc. or 10 grams of solid substance is sufficient for a maximum dose. The substance should be neutralized with the greatest care, as any excess of alkali is irritating to the tissues. There are, however, slight traces of insoluble fatty acids in the solution which are absorbed without difficulty in the tissues. Guinea-pigs inoculated with fatal doses of tubercle bacilli die within six to eight weeks. Treated with my improved substance they remain healthy, and after six months show no trace of the disease. In man, I have found that my improved substance checks the disease in from six to twelve weeks, even in cases absolutely hopeless to any other method of therapy.

Before proceeding to a description of my preferred process of producing my improved substance, the results of analyses of the wax of the tubercle bacillus should be given, as follows: Its iodin value is 9.6. Its saponification number is 100 to 120. Unsaponifiable matter about 15 to 25%, acid value about 20%. It contains also the following ingredients: Cholesterin 5 to 7%, stearin 15 to 18%, olein 10 to 12%, lecithin 6 to 7%. Also contains considerable portions of volatile fatty acids, as formic, butyric, acetic, etc., and traces of palmitic, myristic and lauric acid, cetyl and ceryl alcohols, oleo-resins, coloring matter and traces of other substances which have not been thoroughly investigated.

In carrying out my process for making my improved substance, tubercle bacilli are grown on ordinary suitable culture media, removed by filtration, and carefully washed. They are then dried in an oven, at a low temperature, until completely dry, and pulverized in suitable apparatus, such as a chemist's ball mill. They are a little easier to handle if not pulverized too fine. The waxes and fats in the thoroughly dry and pulverized mass are now saponified, and this step of saponification may be carried out by several methods. I prefer the method in which sodium or potassium alcoholate, preferably sodium alcoholate, is used for saponification. The sodium alcoholate should be freshly prepared from absolute alcohol, and during my whole process great care should be taken to conduct the reactions as free from water as possible.

The dried and pulverized mass, in accordance with my preferred method of treatment, is placed in a flask preferably fitted with a reflux condenser and treated with an excess of sodium alcoholate. The whole mass is then saponified in any suitable manner as by boiling quite freely on a water bath for several hours until saponification is complete. The mixture then contains wax free tubercle bacilli, soaps, unsaponifiable matter, and other substances.

The steps which follow in the description of my process are the steps which I prefer, it being understood that my results may be obtained by different methods, without departing from the spirit of my invention.

The mixture is filtered and those substances soluble in alcohol, as the saponified waxes and fats, pass through the filter, leaving the proteid portion and unsaponifiable matter behind. A little absolute alcohol may be poured on the mass of the filtrate to remove the last traces of the soap from the proteids. The unsaponifiable matter consists of the higher alcohols, which may be separated from the proteid portion of the tubercle bacilli in any suitable and well known manner. These alcohols may then be heated with soda lime or other suitable reagent, until they are converted into fatty acids, chiefly palmitic, which may be added to the alcoholic solution of soaps, if desired. The sodium alcoholate solution contains substantially all the saponifiable matter present in the tubercle bacillus ranging from about 25% to about 45% of the total substance by weight originally treated, and only contains traces of proteid substances which are soluble in alcohol. The alcohol is removed in any suitable manner, as by distillation, and the portion of glycerin formed in the saponification process is then decanted and the solid residue is dissolved in hot water, cooled and treated with dilute acid, as hydrochloric or sulfuric acid, whereby the insoluble fatty acids are precipitated. These insoluble fatty acids are collected on a filter and washed, after which the filtrate is tested for traces of proteid by the biuret test, Millon's test, xanthroproteic, or other suitable proteid test. Some of the volatile fatty acids like formic, butyric and acetic, are present in the filtrate and these are thrown away with the traces of proteid, as they are irritating to the tissues and as they and the proteid substances would prevent the giving of large doses. The next, and probably the most important step in the process, consists in purifying the fatty acids produced, existing at this stage as substances insoluble in cold water. The purification may take place by several methods, but I will describe my preferred method, as follows: The insoluble fatty acids are redissolved, preferably in the minimum amount of hot potassium hydrate, cooled, precipitated with dilute acid in the same manner as in the first instance, again washed, preferably with ice water and the wash water again tested for traces of proteids and other extraneous material. The wash water again contains soluble proteids, the soluble fatty acids mentioned above, some coloring matter and other substances soluble in acidified water. This process of redissolving in hot alkali and re-precipitating with cold dilute acid, is repeated a sufficient number of times, until the fatty acids insoluble in cold water have become completely purified. I consider it essential to the success of my process, that the purification of the fatty acids insoluble in water be made complete, or at least as complete as it can be made. A further purification is then effected, as by means of ether, alcohol, chloroform or some suitable solvent which will not dissolve proteids, oleo-resins and substances of that nature. The precipitated fatty acids are dissolved preferably with ether or alcohol, as in a separatory funnel and the residue containing oleo-resins nucleo-proteids and other extraneous matter is discarded. The solvent is then driven off, as by means of heat, and the fatty acids are redissolved in just sufficient potassium hydrate or other suitable substance capable of converting the fatty acids into compounds soluble in water, great care being taken not to get an excess of the combining substance when an alkali is used. The resulting soap may now be treated by some bleaching process, as peroxid of hydrogen animal charcoal, etc. This purification with alcohol and ether is continued until the resulting soap is clear and opalescent. When bleached, the soap is at first a light amber color, even in concentrations, later turning darker, and to a brownish color. The substance has a thick soapy consistency when concentrated almost to dryness, has a resinous musty odor, and gives a slightly alkaline reaction. It is soluble in water, alcohol and the usual solvents in which soaps are soluble and it answers many of the chemical and physical tests for soaps, particularly soaps produced from waxes.

The process described has produced a soft soap made from the fats and waxes contained in the tubercle bacillus. This substance is free from poisonous properties, and produces in animals and man a specific lipolytic ferment in the tissues in large quantities capable of splitting off the waxy substances contained in the body of the tubercle bacillus, thereby enabling the animal organism to easily destroy the tubercle bacillus, since the proteolytic enzyms are already present. I have discovered that this soap apparently contains no toxic substances and consequently the maximum dose can be rapidly reached. If given too rapidly, the proteid portions of the tubercle bacilli present in the body, are too rapidly split up and thereby set free toxic by-products, in such quantity, as might create some temporary disturbance in the host. Injected into guinea-pigs, inoculated with virulent tubercle bacillus in sufficient quantity to kill the guinea-pig in from six to eight weeks, my new substance causes a practical disappearance of the disease and injections have been given of such size without harm, as to lead to the belief that man could tolerate forty times the present dose I have given him at the date of this application for patent, or even more. Tuberculous guinea-pigs have been given one gram of the solid substance without harm.

My experience with the clinical application of saponified tubercle bacillus wax has been, that in acute and chronic tuberculosis in the first and second stages of the disease, it will produce a practical disappearance of all symptoms of the disease in from two to twelve weeks and a majority of these cases were considered absolutely hopeless to any other heretofore known method of therapy.

In treating tuberculosis with this substance, it is well to give upon the first dose 1-1/100 of a gram of the solid substance properly diluted, increasing the dose at the end of seven days to 1/10 of a gram of solid substance, and at the end of the third week one gram of the solid substance properly diluted. If necessary, at the end of the fourth week, ten grams of solid substance may be given properly diluted in 90 cc. normal salt solution, although it is not always necessary to reach this dose, smaller amounts sometimes being sufficient. After the maximum dose is reached, the same amount is given at intervals, varying from one to four weeks apart, until the host is free from the disease. From time to time, this method might be repeated if there should recur signs of the disease.

I claim and desire to obtain by Letters Patent, the following:

1. The method substantially as herein described of preparing a substance for the treatment of tuberculosis, which consists in saponifying the waxes and fats contained in tubercle bacilli, the soap so obtained being capable when injected into animals or man of producing a lipolytic ferment in the tissues, which ferment will in turn dissolve a sufficient portion of the waxy protective substances elaborated by tubercle bacilli, so that the micro-organism itself is destroyed.

2. The method substantially as herein described of preparing a substance for the treatment of tuberculosis, which comprises saponifying the unextracted wax and fats contained in tubercle bacilli.

3. The method substantially as herein described of preparing a substance for the treatment of tuberculosis, which comprises saponifying the unextracted wax and fats contained in tubercle bacilli, purifying the insoluble fatty acids obtained as a result of the saponification and dissolving said fatty acids in a suitable solvent capable of converting said fatty acids into compounds soluble in water and suitable for injection into man.

4. The method substantially as herein described of preparing a substance for the treatment of tuberculosis, which comprises drying and pulverizing tubercle bacilli, saponifying the mass with a suitable re-agent, filtering the mixture so obtained to remove the proteids and other injurious substances, evaporating the filtrate, and dissolving the residue in a suitable solvent.

5. The method substantially as herein described of preparing a substance for the treatment of tuberculosis, which comprises drying and pulverizing tubercle bacilli, saponifying the mass with a suitable re-agent, filtering the mixture so obtained to remove the proteids and other injurious substances, evaporating the filtrate, dissolving the residue in a suitable solvent, cooling the resulting soap solution, precipitating the insoluble fatty acids with a suitable acid, filtering and washing the precipitate, redissolving and cooling the soap solution, and again precipitating with a suitable acid and repeating the process of redissolving and re-precipitating with an acid until the insoluble fatty acids are purified and dissolving the precipitated fatty acids with a suitable solvent.

6. The method substantially as herein described of preparing a substance for the treatment of tuberculosis, which consists in drying and pulverizing tubercle bacilli, saponifying the mass with a suitable re-agent, filtering the mixture so obtained to remove the proteid portion, evaporating the filtrate, dissolving the residue in a suitable solvent, cooling the resulting soap solution, precipitating the insoluble fatty acids with a suitable acid, filtering and washing the precipitate, redissolving and cooling the soap solution, and again precipitating with a suitable acid and repeating the process of redissolving and re-precipitating with an acid until the insoluble fatty acids are purified, dissolving the precipitated fatty acids with a suitable solvent which will separate them from oleo-resins and other substances insoluble in a solvent of this nature, and discarding the oleo-resins and other extraneous matter, removing the said last-named solvent, and redissolving the fatty acids in a suitable solvent capable of rendering the fatty acids soluble in water, thereby obtaining as a result of the process, a pure soap.

7. The new and improved substance comprising pure saponified tubercle bacillus wax, for the treatment and cure of tuberculosis, said substance having a thick soapy consistency when concentrated almost to dryness and of a brownish color, having a resinous odor, giving a slightly alkaline reaction, of a non-poisonous character when injected into healthy or tuberculous animals or man, and capable of producing a lipolytic ferment in the tissues specific for the wax from which the soap is made.

8. The process substantially as herein described of preparing a derivative from the waxy and fatty protective substances elaborated by tubercle bacilli, which comprises saponifying said protective substances, and purifying the resulting soap until it is substantially free from impurities and toxic substances.

9. As a new article of manufacture, a compound derived from the waxy and fatty protective substances elaborated by tubercle bacilli, and specific against said protective substances, said compound being substantially free from toxic substances, possessing the physical characteristics of soap and giving a slightly alkaline reaction.

10. As a new article of manufacture, a compound derived by saponification from the waxy and fatty protective substances elaborated by tubercle bacilli, and specific against said protective substances, said compound being substantially free from impurities, possessing the physical characteristics of soap, being of a thick soapy consistency when concentrated almost to dryness, of brownish color and having a characteristic resinous musty odor.

11. As a new article of manufacture, a soap derived from the waxy and fatty protective substances elaborated by tubercle bacilli, and specific against said protective substances, said soap being substantially free from impurities and toxic substances, possessing the physical characteristics of soap, answering the usual chemical tests for soap, and of non-poisonous character when injected into healthy or tuberculous animals or men.

12. As a new article of manufacture, a soap derived from the waxes and fats elaborated by tubercle bacilli, and capable of producing a lipolytic ferment in the tissues, said soap being substantially free from impurities and toxic substances, of non-poisonous character when injected into healthy or tuberculous animals or men, of brownish color and of thick soapy consistency when concentrated almost to dryness.

13. As a new article of manufacture, a derivative of the waxy and fatty protective substances elaborated by tubercle bacilli, substantially free from toxic substances, and having the property of so influencing the body cells upon injection as to cause them to produce a lipolytic ferment specific against said waxy and fatty protective substances, and of non-poisonous character when injected into healthy or tuberculous animals or men.

14. As a new article of manufacture, a derivative of the waxy and fatty protective substances elaborated by tubercle bacilli, substantially free from toxic substances, and having the hereindescribed characteristics and the hereindescribed influence upon the body cells upon injection, of brownish color, of thick soapy consistency when concentrated almost to dryness and having a characteristic resinous musty odor.

15. A new article of manufacture, comprising substantially pure saponified tubercle bacillus wax, possessing the physical characteristics of soap and answering the usual chemical tests of soap.

16. As a new article of manufacture, a substantially pure soap derived from the waxy and fatty protective substances elaborated by tubercle bacilli, of brownish color, having a characteristic resinous musty odor and giving a slightly alkaline reaction.

17. As a new article of manufacture, a substantially pure non-poisonous soap derived from the waxy and fatty protective substances elaborated by tubercle bacilli, of thick soapy consistency when concentrated almost to dryness and giving a slightly alkaline reaction.

18. A substantially pure, non-poisonous soap derived from the unextracted waxy and fatty protective substances elaborated by tubercle bacilli, of thick soapy consistency when concentrated almost to dryness and giving a slightly alkaline reaction.

19. A substantially pure non-poisonous soap derived from the unextracted waxy and fatty protective substances elaborated by tubercle bacilli, having a characteristic resinous musty odor and giving a slightly alkaline reaction, of brownish color, possessing the physical characteristics of soap and answering the usual chemical tests of soap.

20. A new article of manufacture, comprising saponified tubercle bacillus wax of thick soapy consistency substantially free from impurities and toxic substances, having a characteristic resinous musty odor, giving a slightly alkaline reaction, answering the physical and chemical tests for soap, and having the property of so influencing the body cells upon injection as to cause them to produce a lipolytic ferment in the tissues specific against the waxy and fatty protective substances elaborated by tubercle bacilli.

21. A new article of manufacture, comprising a soap made by saponifying tubercle bacillus wax, said soap being of brownish color and of a thick soapy consistency when concentrated almost to dryness, having a characteristic resinous musty odor, giving a slightly alkaline reaction, of non-poisonous character when injected into healthy or tuberculous animals or men, capable of producing a lipolytic ferment in the tissues specific against the wax from which the soap is made, substantially free from impurities and toxic substances, possessing the physical characteristics of soap and answering the usual chemical tests for soap.

In testimony whereof I have signed this specification in the presence of two subscribing witnesses.

BENJAMIN S. PASCHALL.

Witnesses:
ROSE GARFIELD PASCHALL,
HERBERT G. OGDEN.